(No Model.)
E. F. LINDSEY.
CHUCK.
No. 347,491. Patented Aug. 17, 1886.
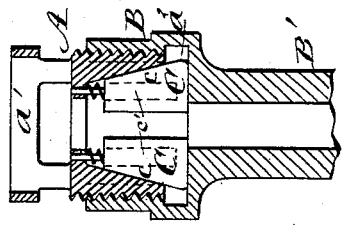
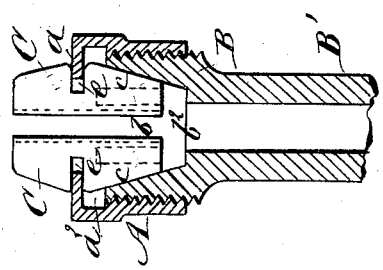
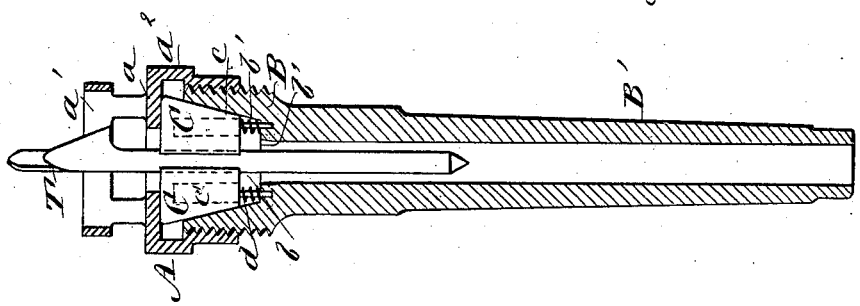
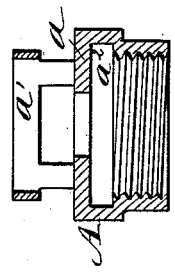
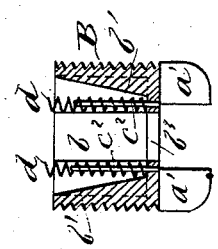
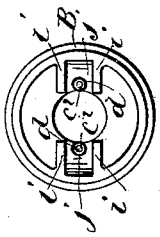
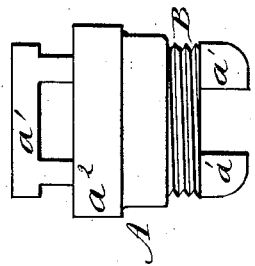
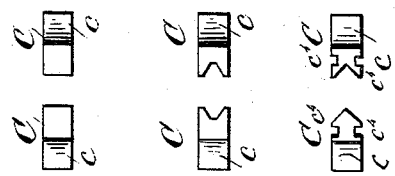
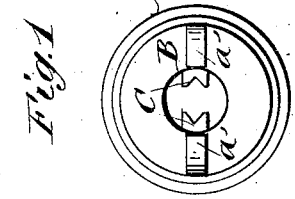
WITNESSES:
C. Neveux
C. Sedgwick
INVENTOR:
E. F. Lindsey
BY Munn & Co
ATTORNEYS.

UNITED STATES PATENT OFFICE.

EDWIN FRANCIS LINDSEY, OF BRISTOL, RHODE ISLAND.

CHUCK.

SPECIFICATION forming part of Letters Patent No. 347,491, dated August 17, 1886.

Application filed January 15, 1886. Serial No. 188,696. (No model.)

*To all whom it may concern:*

Be it known that I, EDWIN FRANCIS LINDSEY, of Bristol, county of Bristol, and State of Rhode Island, have invented a new and Improved Chuck, of which the following is a full, clear, and exact description.

My invention relates to a new and improved chuck for holding or to be applied to a boring, drilling, or other tool, formed with a spindle or shank. The chuck is provided with two sliding jaws for grasping the tool.

The invention consists, principally, in providing the jaws with spring seats or supports for opening the jaws to receive the shank of the tool between them, thus avoiding trouble and delay in inserting the tool.

The invention also consists in forming the jaws with inclined outer surfaces to act in connection with a bevel in the chuck-core for closing the jaws upon the tool, also in forming the chuck with a projecting flange or rim to adapt the chuck to be used as a gage to prescribe the depth of the hole to be bored or drilled.

The invention finally consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is an end view of the chuck without a spindle. Fig. 2 is a side elevation of the same. Fig. 3 is a sectional elevation of the chuck-ring. Fig. 4 is a similar view of the chuck-core removed from the ring and without the jaws. Fig. 5 is a plan view of the core with the jaws removed. Fig. 6 is a longitudinal sectional elevation of the chuck formed with a spindle and having a tool secured therein. Fig. 7 shows a modification; Fig. 8, another modification without the gage-flange; and Fig. 9 shows various forms of jaws.

The chuck comprises a ring, A, a core, B, and two jaws, C C, inclosed in a conical cavity, $b$, in the core. The core B, in the preferred construction, screws into the ring A, and the ring is formed with the inwardly-projecting flange $a$, which serves to retain the jaws C in place in the cavity $b$ and to operate them in one direction, as hereinafter described. The jaws C are duplicates of each other, each being inclined at the outer edge, $c$, to fit against the bevel $b'$, formed by the walls of the conical chamber $b$. The adjacent edges of the two jaws are straight and parallel, and these edges may be plain, grooved, or tongued and grooved, as shown in Fig. 9, or of any other desired form. The outer ends of the jaws are wider than the inner ends, except in the form of chuck shown in Fig. 7, and the jaws rest upon coiled springs $d$, which enter small cavities or holes $c'$, made in the jaws to receive the springs, and also the small studs $c^2$, on which the springs are placed. The studs $c^2$ are made fast at their inner ends to the core B at the bottom of the cavity $b$, as shown clearly in Fig. 4, and about the studs is formed a shoulder or offset, $b^2$, that furnishes a seat for the springs $d$, so the springs act to force the jaws C outward as far as the flange $a$ of the ring A will permit, and the springs permit the jaws to move longitudinally in the conical chamber $b$ when the core is screwed into the ring or the ring upon the core. The jaws C, working on a bevel or resting against the inclined walls of the conical chamber $b$, as they do, the screwing of the core B into the ring A causes the jaws to approach each other so that they may be closed with great firmness upon the tool T, as shown in Fig. 6. By screwing the core B out of the ring A the spring will force the jaws outward with the flange $a$ and release the tool, and the jaws, owing to the bevels, are at the same time spread sufficiently to not interfere with the insertion of another tool into the chuck.

In the forms of chuck shown in Figs. 2, 3, and 6 the ring A is formed or provided with a flange or guard, $a'$, which serves to limit the distance the tool T may enter any object to be bored or drilled.

In the form of short chuck shown in Figs. 1, 2, and 4 the core B is formed or provided with thumb-pieces $a'$ $a'$, by which it may be easily screwed into and unscrewed from the ring A.

In the forms of chuck shown in Figs. 6, 7, and 8 the core B is formed with a shank, B', to adapt the chuck to be held in a lathe.

In the form of chuck shown in Fig. 8 the flange-gage $a'$ is omitted from the ring A, and the jaws C C are extended outward beyond the flange $a$, and at the center they are slotted, as shown at $c$, in which slots the flange $a$ fits, so that these jaws have a positive movement with the ring A.

In the form of chuck shown in Fig. 7 the jaws move on a taper, the same as in the other figures; but the parts are reversed in construction and arrangement, so the core becomes the ring and the ring the core, and the jaws C have the reverse incline or taper.

In all the forms shown the ring is slightly enlarged, as shown at $a^2$, to form a clearance for the outer angles of the jaws C C when they are open to receive a tool. In most cases the core B will be formed or provided with flanges $i\ i$, or other means for retaining the jaws C C against lateral displacement.

I prefer to construct the interior of the core as shown clearly in Fig. 5, with tapering narrow boxes $j\ j$, to receive the jaws, the springs $d$ being held in the boxes upon the studs or pins $c^3$, as shown. In some instances I shall form the jaws C with side grooves, $c^4$, as shown in Fig. 9, in which case inclined ribs will be formed upon the adjacent surfaces of the flanges $i$, to enter the grooves for holding the jaws in place.

Having thus fully described my invention, I claim as new and desire to secure by Letters Patent—

1. In a chuck, the combination of a core having a tapering chamber, a ring screwed upon the core and formed with a flange, and two tapering jaws held in the core upon springs, substantially as and for the purpose set forth.

2. The core B, formed with the flanges $i$ and inclines $j$, and provided with the pins $c^3$ and coiled springs $d$, in combination with the tapered jaws C and flanged ring A, substantially as described.

3. The ring A, formed or provided with a gage-flange, $a'$, whereby the chuck may be used as a gage upon a boring or drilling tool, substantially as described.

EDWIN FRANCIS LINDSEY.

Witnesses:
CHARLES J. PEPER,
CHARLES E. MAURY.